(12) United States Patent
Chen et al.

(10) Patent No.: US 10,987,909 B2
(45) Date of Patent: Apr. 27, 2021

(54) METHOD OF LAMINATING FILM FOR DYE-SENSITIZED CELL

(71) Applicant: FORMOSA PLASTICS CORPORATION, Kaohsiung (TW)

(72) Inventors: Ching-Fu Chen, Kaohsiung (TW); Hao-Wei Chen, Kaohsiung (TW); Kun-Tai Ho, Kaohsiung (TW); Wan-Tun Hung, Kaohsiung (TW); Po-Min Chen, Kaohsiung (TW); Liang-Kun Huang, Kaohsiung (TW); Chih-Chou Chang, Kaohsiung (TW); Yung-Liang Tung, Hsinchu County (TW); Po-Tsung Hsiao, Hsinchu County (TW); Ming-De Lu, Hsinchu County (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 85 days.

(21) Appl. No.: 16/590,629

(22) Filed: Oct. 2, 2019

(65) Prior Publication Data
US 2020/0101711 A1 Apr. 2, 2020

(30) Foreign Application Priority Data
Oct. 2, 2018 (TW) .................................. 107134838

(51) Int. Cl.
*B32B 37/00* (2006.01)
*B32B 27/32* (2006.01)
(Continued)

(52) U.S. Cl.
CPC .......... *B32B 37/025* (2013.01); *B32B 27/322* (2013.01); *B32B 27/36* (2013.01);
(Continued)

(58) Field of Classification Search
CPC ... Y02E 10/542; B32B 2457/12; B32B 37/10; B32B 37/0046; B32B 37/1207;
(Continued)

(56) References Cited

U.S. PATENT DOCUMENTS

| 2013/0095578 A1* | 4/2013 | Baccini | ............. H01L 21/67712 438/14 |
| 2013/0299062 A1* | 11/2013 | Ng | ...................... B32B 38/1841 156/64 |
| 2015/0299519 A1* | 10/2015 | Nishijima | ................ C09J 7/383 257/40 |

FOREIGN PATENT DOCUMENTS

WO WO-2014112624 A1 * 7/2014 ........... H01G 9/2095

OTHER PUBLICATIONS

Machine translation of WO 2014112624 date unknown.*
"Tetoron®" from tekra.com date unknown.*

* cited by examiner

*Primary Examiner* — John L Goff, II
(74) *Attorney, Agent, or Firm* — Muncy, Geissler, Olds & Lowe. P.C.

(57) ABSTRACT

The present invention provides a method of laminating a film for a dye-sensitized cell. First, a composite film is taken by a robotic arm, in which the composite film includes a release layer, a protective layer and a hot glue layer between the release layer and the protective layer, and the release layer is removed by the robotic arm. Then, the hot glue layer is precisely attached to a substrate by a target positioning step. Next, the protective layer is removed by the robotic arm.

14 Claims, 8 Drawing Sheets

(51) Int. Cl.
*B32B 27/36* (2006.01)
*B32B 37/10* (2006.01)
*B32B 37/12* (2006.01)
*B32B 37/26* (2006.01)

(52) U.S. Cl.
CPC .......... *B32B 37/0046* (2013.01); *B32B 37/10* (2013.01); *B32B 37/1207* (2013.01); *B32B 37/26* (2013.01); *B32B 2037/1215* (2013.01); *B32B 2037/268* (2013.01); *B32B 2309/02* (2013.01)

(58) Field of Classification Search
CPC ... B32B 37/26; B32B 37/025; B32B 37/0053; B32B 2037/1215; B32B 2037/268; B32B 2037/27; B32B 2037/322; B32B 2037/36; B32B 38/10; B32B 38/1833; B32B 38/1841; B32B 2038/1891; B32B 2309/02; B32B 39/00; H01L 21/68; H01L 21/681; H01L 2224/0224; H01L 2224/03005; H01L 2224/27005; H01L 13/18; H01L 13/1876; B29C 65/7817; B29C 66/863
USPC .......................... 156/289, 230, 235, 247, 249
See application file for complete search history.

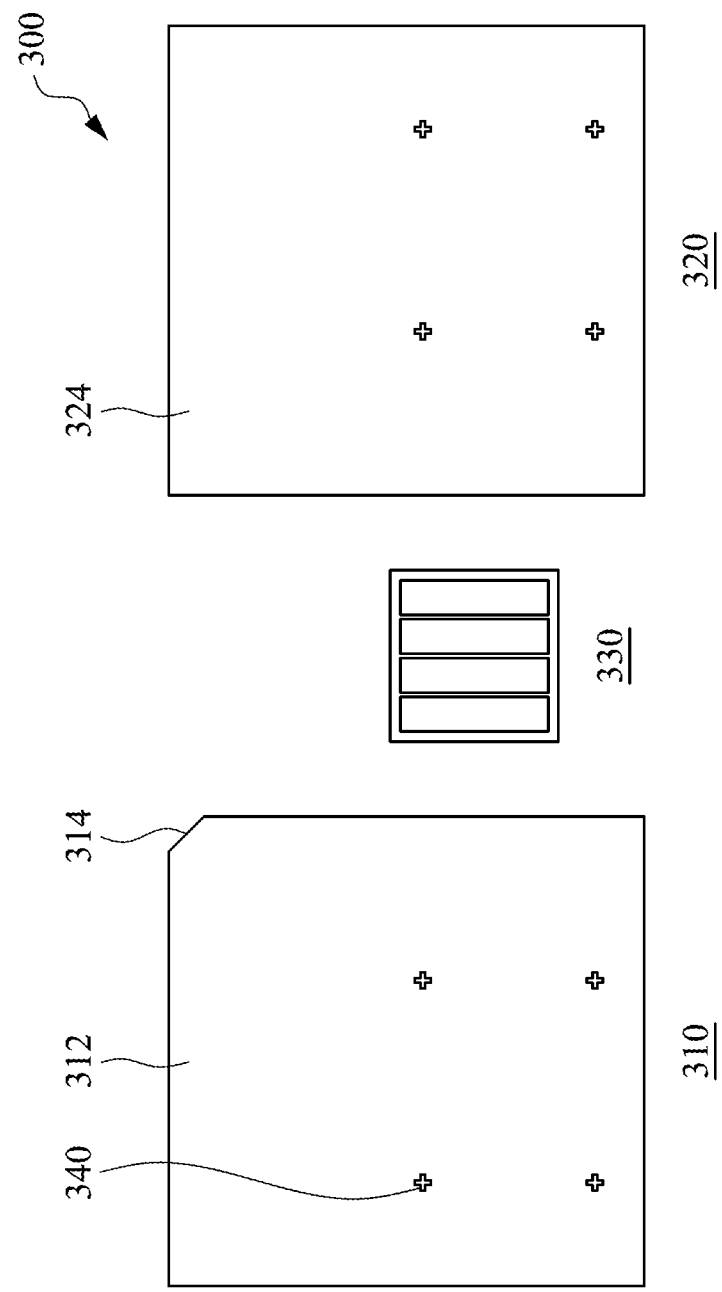

METHOD OF LAMINATING FILM FOR DYE-SENSITIZED CELL

RELATED APPLICATIONS

This application claims priority to Taiwan Application Serial Number 107134838, filed on Oct. 2, 2018, which is herein incorporated by reference.

BACKGROUND

Field of Invention

The present invention relates to a method of laminating film, especially relates to an automated method of laminating film of an electrode, and the method is applied an assembly step of a dye-sensitized cell.

Description of Related Art

Recently, with a rise of environmental awareness, importance of a solar cell is increased in green electrical energy field. Because a dye-sensitized cell has lower cost, simpler process, excellent light-transmissibility property and the like, it is applied in many filed.

Generally, the process of the dye-sensitized cell includes processes of manufacturing a counter electrode and a working electrode, packaging, filling of electrolyte through a filling hole, sealing the filling hole and the like. When the counter electrode and the working electrode are packaged, it is necessary to dispose an adhesion agent layer on the counter electrode, and then aligning and overlapping with the working electrode. The aforementioned processes of disposing the adhesion agent layer and overlapping with the electrodes both require precise aligning technology to enhance yield rate of the dye-sensitized cell.

The aforementioned packaging steps are generally performed by manual process, such that the dye-sensitized cell has lower production rate and higher cost of human resource, further inducing problems of poor yield rate of the cell caused by imprecise aligning. Besides, the adhesion agent layer used in the packaging steps is a hot glue layer, but the hot glue layer is not fixed on the counter electrode, such that it is necessary to additionally heat the hot glue layer for softening it and enhancing stickiness. Therefore, the hot glue layer often diverges from a predetermined position due to movement or other extrinsic factors after the pre-alignment has been done. Further, if the hot glue layer has been heated, the softened hot glue layer would be hardly taken and disposed on the counter electrode.

In view of this, there is an urgent need to provide a method of laminating film. The method could replace the manual process with automatically process, such that the hot glue layer can be precisely disposed on the electrode. Moreover, the method could simultaneously dispose and fix the hot glue layer on the electrode to prevent the hot glue layer from diverging from the predetermined position after alignment.

SUMMARY

An aspect of the present invention provides a method of laminating film of a dye-sensitized cell. In some embodiments, a composite film is firstly provided. The composite film comprises a release layer, a protective layer, and a hot glue layer between the release layer and the protective layer. The protective layer is adhered to the hot glue layer by an adhesion agent. A plurality of first targets respectively are at least disposed on outer surfaces of the release layer and the protective layer opposite to inner surfaces of the release layer and the protective layer where the hot glue layer is disposed. A thermal degradation temperature of the aforementioned adhesion agent is smaller than a softening temperature of the hot glue layer. Then, providing a substrate on a loading platform, a plurality of second targets are on an upper surface of the substrate, and the loading platform heats the substrate at least to the softening temperature. Next, taking the composite film with a robotic arm. Then, absorbing the composite film on a rolling device with the protective layer. Next, removing the release layer from the composite film by the robotic arm. And then, positioning the first targets and the second targets to align the substrate with the hot glue layer. Then, subjecting the hot glue layer to approach the substrate. Next, rolling the composite film along a first direction by a roller of the rolling device, so as to adhere the hot glue layer to the substrate. And then, removing the protective layer.

According to an embodiment of the present invention, the loading platform heats the substrate to 90° C. to 160° C.

According to an embodiment of the present invention, sizes of the release layer and the protective layer are respectively larger than a size of the hot glue layer, and the size of the release layer is larger than the size of the protective layer.

According to an embodiment of the present invention, the process of positioning the first targets and the second targets further comprises: shooting the first targets with a first charge-coupled device (CCD) apparatus; shooting the second targets with a second charge-coupled device apparatus; calculating a relative position of the first targets and the second targets; and correcting a coordinate of the loading platform.

According to an embodiment of the present invention, the first charge-coupled device apparatus is disposed under the rolling device, and the second charge-coupled device apparatus is disposed above the loading platform.

According to an embodiment of the present invention, the first charge-coupled device apparatus and the second charge-coupled device apparatus respectively includes a plurality of charge-coupled devices.

According to an embodiment of the present invention, the process of correcting the coordinate of the loading platform comprises: adjusting a position of the loading platform along the first direction; and subjecting the loading platform to move to a position beneath the rolling device along a second direction perpendicular to the first direction.

According to an embodiment of the present invention, the process of rolling the composite film along the first direction by the roller of the rolling device comprises at least one of following steps: adjusting a pressure applied by the roller; adjusting a moving velocity of the roller along the first direction; and adjusting a travel of the roller.

According to an embodiment of the present invention, the process of absorbing the composite film on the rolling device is achieved by absorbing the protective layer on a screen plate of the rolling device.

According to an embodiment of the present invention, a material of the screen plate includes schappe, nylon or polyester sold under the trademark Tetoron.

According to an embodiment of the present invention, the protective layer and the release layer respectively has a thickness of 0.05 mm.

According to an embodiment of the present invention, materials of the protective layer and the release layer respectively include polyethylene terephthalate (PET) or polyethylene (PE).

According to an embodiment of the present invention, the adhesion agent includes an acrylic type adhesion agent.

According to an embodiment of the present invention, the substrate is an electrode of the dye-sensitized cell.

BRIEF DESCRIPTION OF THE DRAWINGS

The invention can be more fully understood by reading the following detailed description of the embodiment, with reference made to the accompanying drawings as follows.

FIG. 3B is a top-view diagram of each layers of the composite film of FIG. 3A.

DETAILED DESCRIPTION

The present invention provides a method of laminating film of a substrate. Especially, the method is applied in assembling a dye-sensitized cell, thereby covering the hot glue layer on the electrode. The method can automatically take the film, align and adhere, therefore lowering labor cost, enhancing aligning precision, improving yield rate of products and enhancing production rate.

It is noted that although the present invention takes an electrode of a dye-sensitized cell for examples to describe the steps of laminating film, the method should be applied in other substrates by adjusting and modifying parameters. Therefore, other suitable substrates are involved in the scope of the present invention.

Figure 1A:
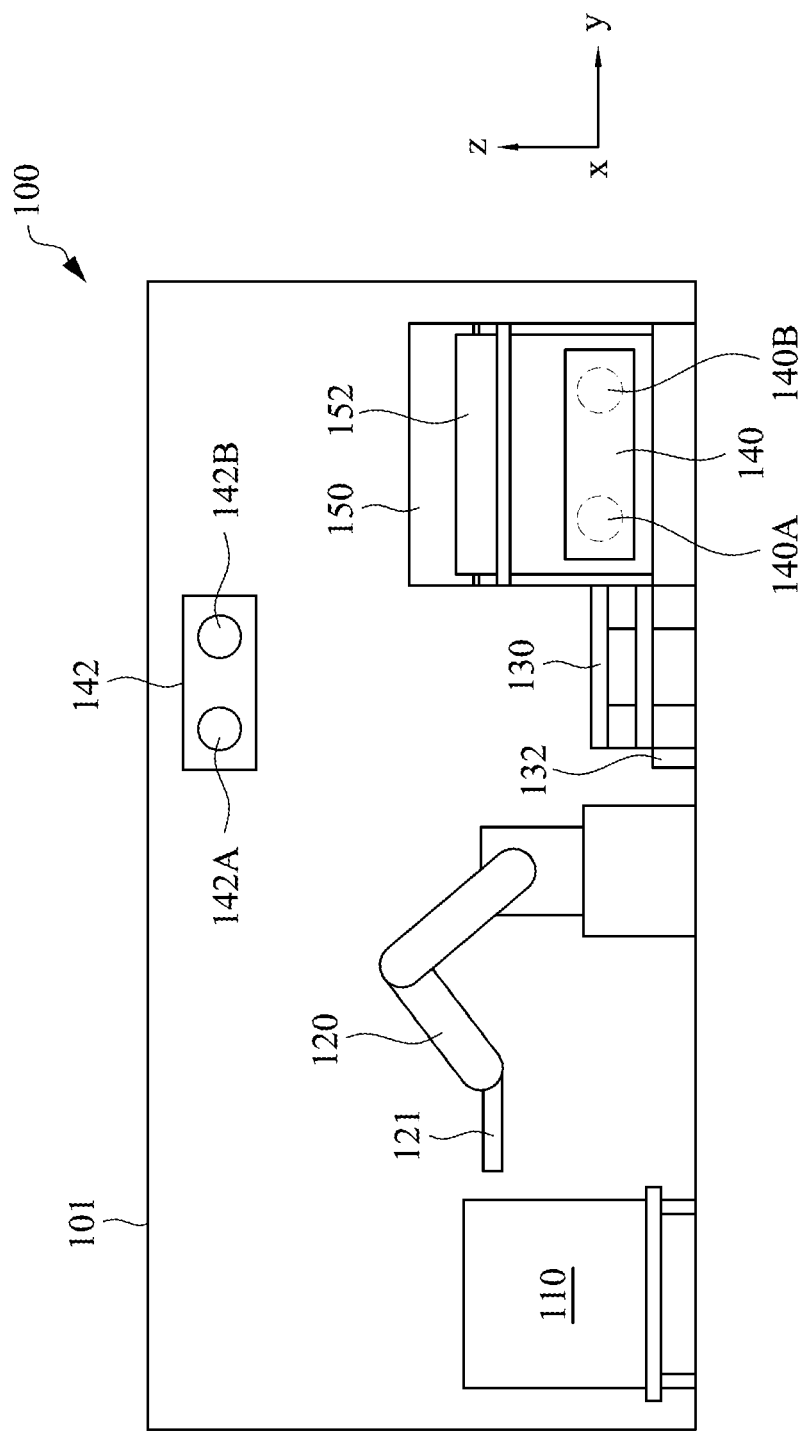
FIG. 1A is a side-view diagram of a laminating film system according to an embodiment of the present invention.

In some embodiments, the method is performed by a film-laminating system shown as FIG. 1A. Shown as FIG. 1A, the system 100 comprises a chamber 101, a containing cartridge 110, a robotic arm 120, a loading platform 130, a first charge-coupled device apparatus 140, a second charge-coupled device apparatus 142, and a rolling device 150. The rolling device 150 includes a roller 152, and the roller 152 can move along a first direction x. The loading platform 130 is slidably disposed on a track 132, such that the loading platform 130 can slide along a second direction y.

Figure 1B:
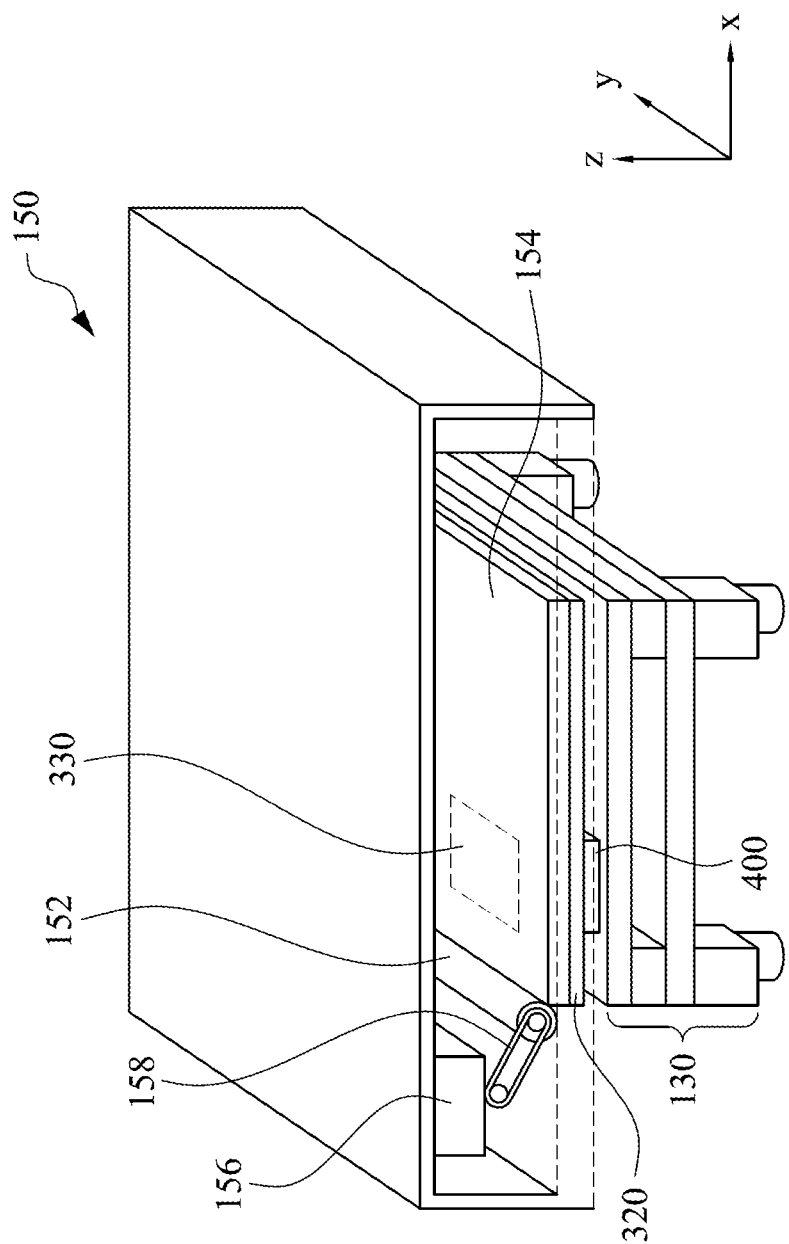
FIG. 1B is a perspective diagram of the laminating film system subjected to multiple steps of a method of laminating film according to an embodiment of the present invention.
Figure 2:
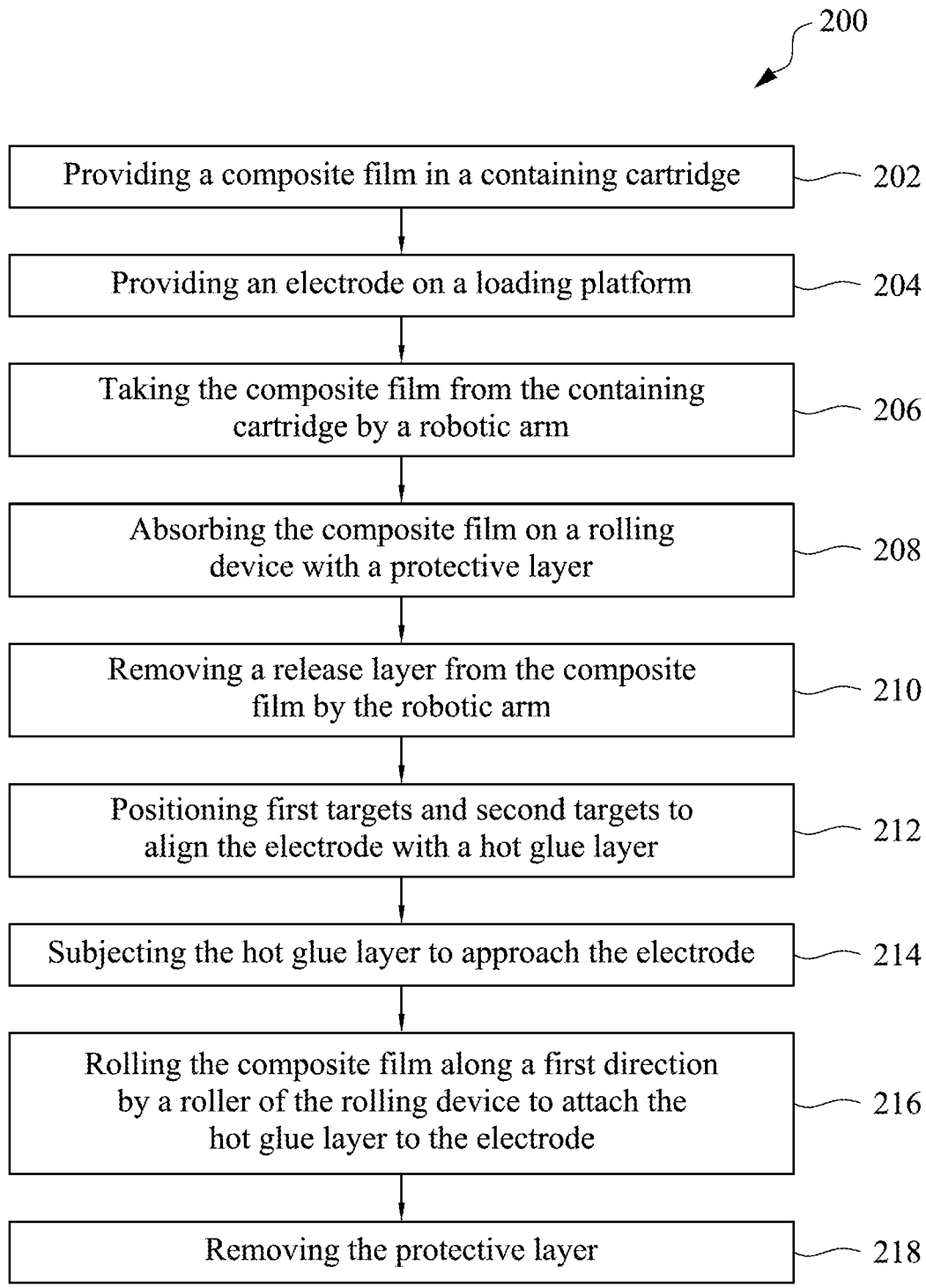
FIG. 2 is a flowchart diagram of the method of laminating film according to an embodiment of the present invention.
Figure 3A:
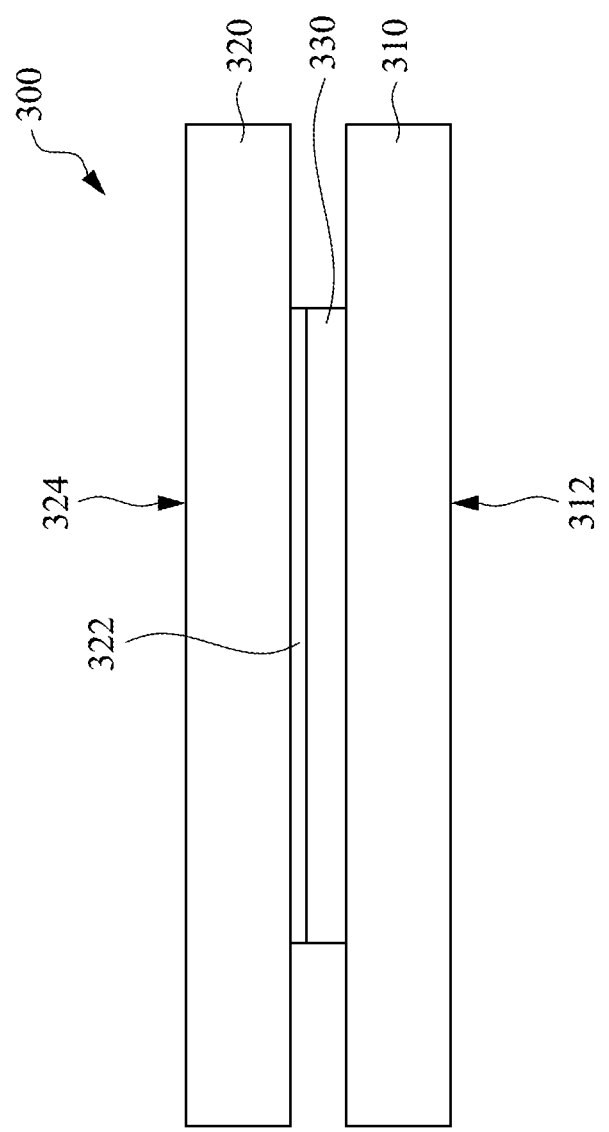
FIG. 3A is a cross-section diagram of a composite film according to an embodiment of the present invention.
Figure 4:
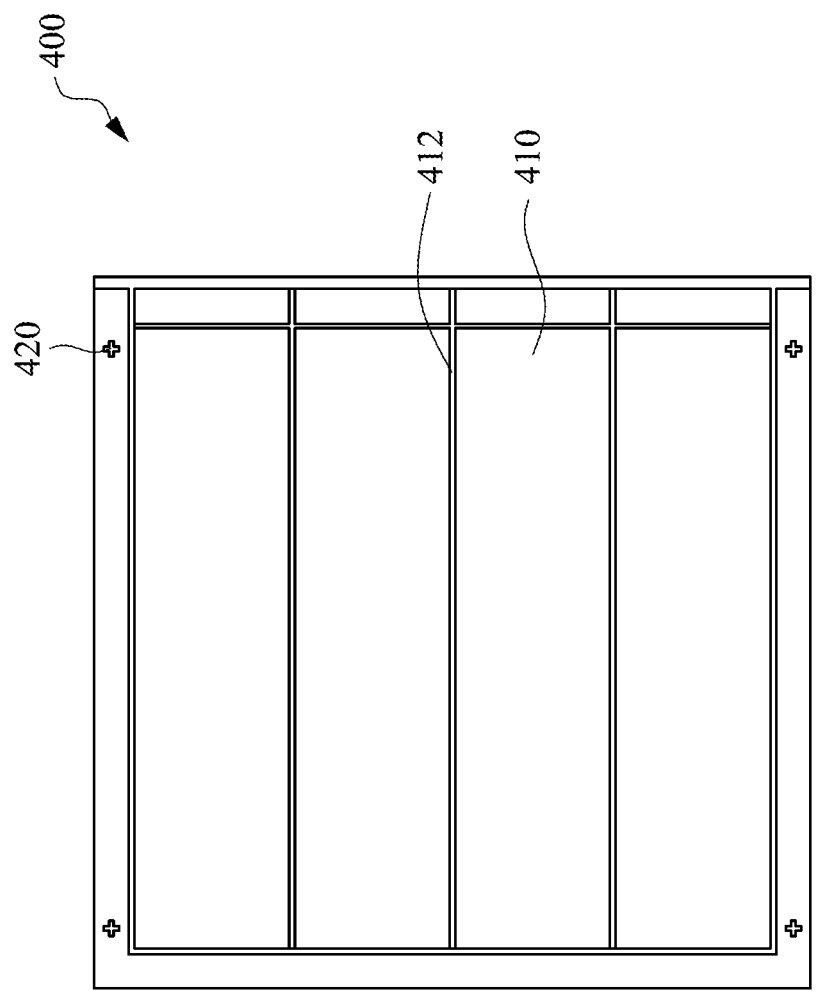
FIG. 4 is a top-view diagram of an electrode.

Referring to FIG. 1A to FIG. 4. FIG. 1B is a perspective diagram of the laminating film system subjected to multiple steps of a method of laminating film according to an embodiment of the present invention. FIG. 2 is a flowchart diagram of the method of laminating film according to an embodiment of the present invention. FIG. 3A is a cross-section diagram of a composite film according to an embodiment of the present invention. FIG. 3B is a top-view diagram of each layers of the composite film of FIG. 3A. FIG. 4 is a top-view diagram of an electrode 400.

Shown as step 202 in FIG. 2, a composite film is firstly provided. For example, the composite film can be located in the containing cartridge 110. Shown as FIG. 3A, the composite film 300 can include a release layer 310, a protective layer 320, and a hot glue layer 330 between the release layer 310 and the protective layer 320. The protective layer 320 is adhered to the hot glue layer 330 by an adhesion agent 322. Shown as FIG. 3B, a plurality of first targets 340 are disposed at least on an outer surface 324 of the protective layer 320. In some embodiments, a plurality of first targets 340 which aligns with those on the outer surface 324 of the protective layer 320 are disposed on an outer surface 312 of the release layer 310. The outer surface 312 and the outer surface 324 are relative to inner surfaces where the release layer 310 and the protective layer 320 contact the hot glue layer 330, and the outer surface 312 and the outer surface 324 are outer surfaces of the composite film 300. In some embodiments, the first targets 340 are also disposed on inner surfaces of the release layer 310 and/or the protective layer 320, for example, the first targets 340 are simultaneously formed with the first targets 340 on the outer surface 312 and/or the outer surface 324 by the same process. In some embodiments, numbers of the first targets can be varied, such as two, three or more.

In some embodiments, sizes of the release layer 310 and the protective layer 320 are respectively larger than a size of the hot glue layer 330. In some examples, the size of the release layer 310 is larger than the size of the protective layer 320, thereby facilitating to remove the release layer 310 in following step 208. In some examples, the release layer 310 and the protective layer 320 have fixed sizes, and a size of the hot glue layer 330 can be varied according to different electrodes. The film-laminating system 100 can be applied for electrodes with different sizes by fixing the sizes of the release layer 310 and the protective layer 320 and adjusting the size of the hot glue layer 330, thereby decreasing parameters of the film-laminating system 100 which need to be adjusted. For example, merely adjusting positions of the first targets 340 on the release layer 310 and the protective layer 320. The term "sizes" can be areas of the outer surface 312 and the outer surface 324 of the release layer 310 and the protective layer 320. In some examples, a corner of the release layer 310 can be a cutting corner 314 for facilitating to identify a direction of the composite film 300.

In some embodiments, thicknesses of the release layer 310 and the protective layer 320 can respectively be larger than 0.05 mm to support the hot glue layer 330, thereby facilitating to take the composite film 300 with the robotic arm in the automated process. In some embodiments, the thickness of the release layer 310 can be 0.05 mm to 0.1 mm. In some embodiments, a sum of the thicknesses of the release layer 310 and the protective layer 320 can be 0.15 mm to 0.2 mm. If the thicknesses of the release layer 310 and the protective layer 320 are much thinner, a hardness of the composite film 300 will be insufficient, such that it is hard to levelly take the composite film 300 for robotic arm 120, thereby damaging the composite film 300 and affecting following position process. Besides, if the thickness of the release layer 310 is much thicker, it will be disadvantageous for removing the release layer 310 in following step 208. In some embodiments, materials of the protective layer 320 and the release layer 310 respectively includes polymeric materials with higher heat resistance than the hot glue layer 330, such as (not limited to) polyethylene terephthalate (PET) or polyethylene (PE). In some embodiments, a thermal degradation temperature of the adhesion agent 322 is smaller than a softening temperature of the hot glue layer 330. While the thermal degradation temperature of the adhesion agent 322 is much higher, it will result in defects of removing the protective layer 320 hardly. The adhesion agent 322 can be an acrylic type adhesion agent. In some embodiments, the hot glue layer 330 can be any hot glue with the softening temperature of 90° C. to 160° C. In one example, a material of the hot glue layer 330 can include but not be limited to polyurethane, rubber type hot glue, polyolefin type hot glue, ethylene vinyl acetate (EVA) copolymer hot glue or the like.

Next, shown as step 204 in FIG. 2, an electrode is provided to the loading platform 130. Referring to FIG. 4. The electrode 400 includes a conductive substrate 410, and conductive lines 412 and a plurality of second targets 420 are distributed over the conductive substrate 410. In some embodiments, the conductive substrate 410 is a transparent conductive glass. In some embodiments, a material of the conductive lines 412 can be silver. However, in other embodiments, the second targets 420 can be located on other positions.

In some embodiments, an amount of the second targets 420 can be varied, such as two, three or more, but the amount of the second targets 420 is the same as an amount of the first targets 340. Especially, the electrode 400 is not illustrated in scale with the hot glue layer 330 of FIG. 3B for clearly illustrating the second targets 420 on the electrode 400, but the electrode 400 of FIG. 4 and the hot glue layer 330 of FIG. 3B have the same size, thereby subjecting the hot glue layer 330 to cover the electrode 400. Besides, although the conductive lines 412 shown in FIG. 4 are illustrated with a specific distribution, it is merely for clearly describing the present invention. Other distributions are involved in the present invention, and a pattern of the hot glue layer is adjusted according to the distribution of the conductive lines. Accordingly, other patterns of the hot glue layer are involved in a scope of the present invention.

Next, shown as step 206 in FIG. 2, the composite film 300 is taken from the containing cartridge 110 by the robotic arm 120. In some examples, the robotic arm 120 includes a sucker 121, and the sucker 121 can take the composite film 300 and the electrode 400 with vacuum absorbing. Then, shown as step 208 in FIG. 2, the composite film 300 is absorbed on the rolling device 150 with the protective layer 320. In an embodiment, the protective layer 320 is absorbed on a screen plate 154 (FIG. 1B) of the rolling device 150. The screen plate 154 is disposed under the roller 152 to prevent the roller 152 from directly contacting the protective layer 320. In some embodiments, the screen plate 154 can be connected to an absorbing device. For example, the composite film 300 is absorbed by a vacuum absorbing device. In some embodiments, the screen plate 154 is preferably made from a flexible material, such as schappe, nylon or Tetoron, for preventing from scratching the composite film 300.

And then, shown as step 210 in FIG. 2, the release layer 310 is removed from the composite film 300 by the robotic arm 20. Especially, because it is not attached with an adhesion agent between the release layer 310 and the hot glue layer 320, the release layer 310 can be easily removed by the robotic arm 120. In some embodiments, the release layer 310 is removed by another sucker (not illustrated) of the robotic arm 120, and an absorbing area of the another sucker can smaller than the sucker 121. In an example, an edge (shown as a protruding portion illustrated in FIG. 5B) of the release layer without overlapping the protective layer is absorbed by the another sucker.

Then, shown as step 212 in FIG. 2, the first targets 340 are positioned to the second targets 420 to align the electrode 400 with the hot glue layer 320. In some embodiments, the step 212 includes following operation: (1) shooting the first targets 340 with a first charge-coupled device apparatus 140; (2) shooting the second targets 420 with a second charge-coupled device apparatus 142; (3) calculating a relative position of the first targets 340 and the second targets 420; and (4) correcting a coordinate of the loading platform. In some embodiments, the first charge-coupled device apparatus 140 is disposed under the rolling device 150 for upward shooting the first targets 340. In some embodiments, the second charge-coupled device apparatus 142 is disposed above the loading platform 130 for downward shooting the second targets 420 on the electrode 400.

In some embodiments, the first charge-coupled device apparatus 140 and the second charge-coupled device apparatus 142 respectively include a plurality of charge-coupled devices. For example, four charge-coupled devices 140A, 140B, 142A and 142B are illustrated in FIG. 1A. However, an amount of the charge-coupled devices can be increased or decreased based on the aligning precision, and any amounts of the charge-coupled devices are involved in the scope of the present invention.

In some embodiments, the calculating of the aforementioned operation (3) can be performed to calculate an offset of the first target 340 and the second target 420 located in the same corner, and the offset is compared with a preset offset to obtain a coordinate value to be adjusted.

In some embodiments, for example, the aforementioned operation (4) can: firstly adjusting a position of the loading platform 130 along the first direction x, and then subjecting the loading platform 130 to move to a position beneath the rolling device 150 along the track 132 extending along the second direction y perpendicular to the first direction x. In an example, the loading platform 130 can be a XXY loading platform.

Then, shown as step 214 in FIG. 2, the hot glue layer 330 is subjected to approach the electrode 400. In an embodiment, shown as FIG. 1B, the step of subjecting the hot glue layer 330 to approach the electrode 400 comprises adjusting a height of the rolling device 150 to subject the hot glue layer 330 to apart a preset height (not illustrated) from the electrode 400. In an example, adjusting the height of the rolling device 150 can be achieved by a cylinder in the rolling device 150 (not illustrated), but the present invention is not limited in the aforementioned examples.

Then, shown as step 216 in FIG. 2, the composite film 300 is rolled along the first direction x by the roller 152 of the rolling device 150 to attach the hot glue layer 330 to the electrode 400, shown as FIG. 1B. Explicitly, when the composite film is rolled (through the screen plate 154), the rolling is performed by driving a servo slide table 156 with a cylinder, and driving the roller 152 and adjusting a velocity of the roller 152 with a belt 158 of the servo slide table 156. In some embodiments, a pressure applied on the composite film 300 with the roller 152 can be adjusted. In other embodiments, a travel of the roller 152 can be adjusted. The aforementioned preset height is designed based on a dropping height of the roller 152 when the roller 152 is driven by the cylinder. Moreover, because the electrode 400 is heated to at least the softening temperature (such as 90° C. to 160° C.) of the hot glue layer 330, the hot glue layer 330 has been softened during rolling. Therefore, rolling the composite film 300 along the same direction contributes to attach the softened hot glue layer 330 on the electrode 400 and exhaust air between the hot glue layer 330 and the electrode 400. In an embodiment, the rolling device 150 can heat the composite film 300 to contribute to remove the protective layer 320, shown as following step 218.

Then, shown as step 218 in FIG. 2, the protective layer 320 is removed. In an embodiment, removing the protective layer 320 is performed by removing the protective layer 320 from the electrode 400 with the robotic arm 120. Explicitly, because the adhesion agent 322 between the protective layer 320 and the hot glue layer 330 is thermally degraded at the softening temperature of the hot glue layer 330, a stickiness of the adhesion agent 322 is lost. Therefore, the protective layer 320 can be easily removed from the electrode 400 after laminating film is completed.

Figure 5A:
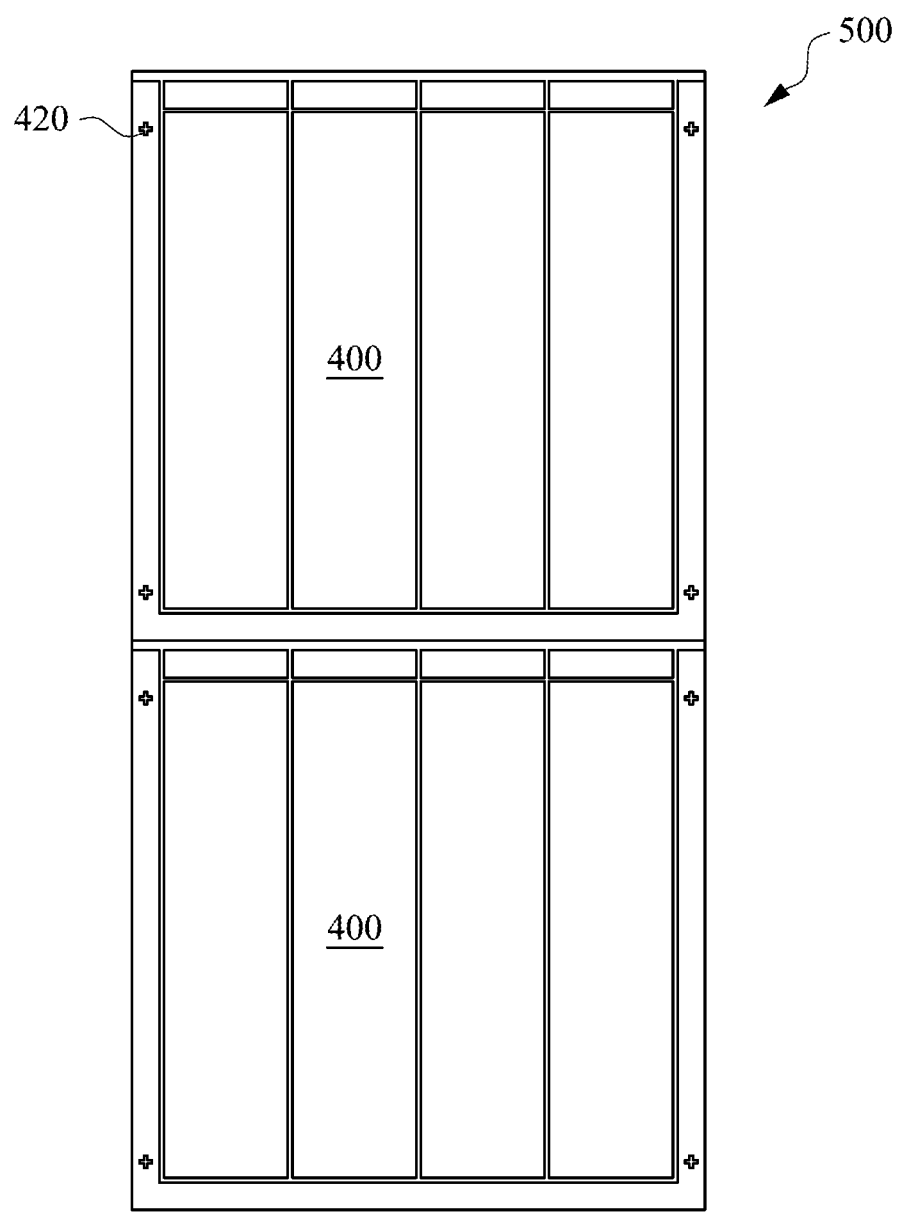
FIG. 5A is a conductive substrate comprising two electrodes.
Figure 5B:
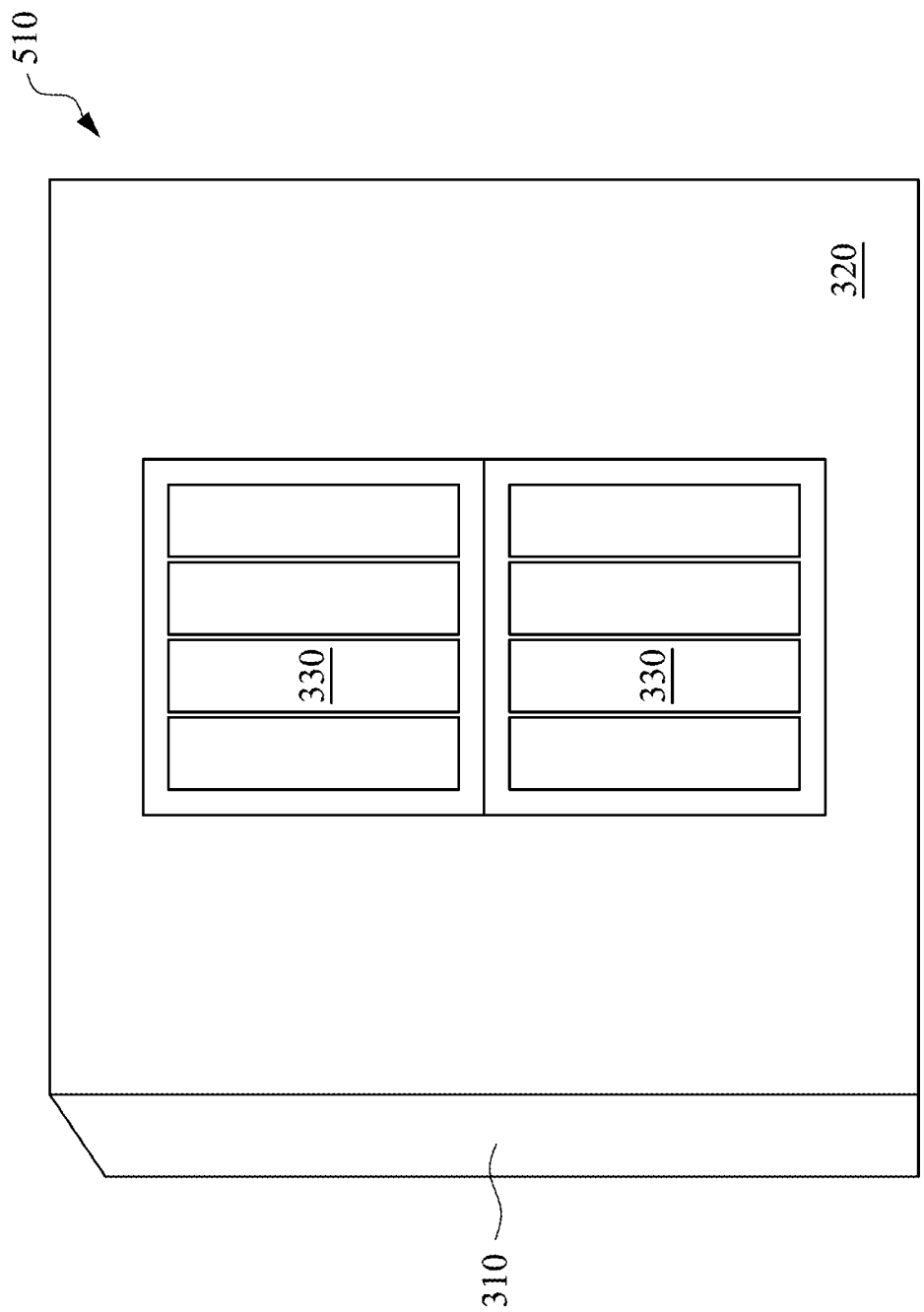
FIG. 5B is a composite film comprising two hot glue layer.

In some embodiments, a plurality of electrode 400 can be simultaneously subjected to attaching of the hot glue layer 330, shown as FIG. 5A and FIG. 5B. FIG. 5A illustrates a conductive substrate 500 with two electrodes 400. FIG. 5B illustrates a composite film 510 with two hot glue layers 330, and the release layer 310 and the protective layer 320 illustrated in FIG. 5B are the same as those in FIG. 3A and FIG. 3B, therefore representing those with the same reference signs. In FIG. 5A and FIG. 5B, four corners in each of the hot glue layers 330 all have a first target 340, and four corners in each of the electrodes 400 all have a second target 420, thereby corresponding the first targets 340 with the second targets 420. In other embodiments, there are four first targets on the corners of a rectangle formed with the two hot glue layers 330, and there are four second targets 420 corresponding to the four first targets on four corners of the conductive substrate 500. However, other dispositions of the targets are involved in the scope of the present invention.

In an embodiment, the composite film 300 in the step 202 to step 218 of the method 200 illustrated in FIG. 2 can be replaced with the composite film 510 illustrated in FIG. 5B, and the electrode 400 in the step 202 to step 218 can be replaced with the conductive substrate 500 illustrated in FIG. 5A. In the embodiment, after the hot glue layer 330 is attached, the conductive substrate 500 can be subjected to a cutting process, thereby obtaining a single electrode 400. After the protective layer 320 is removed, the aforementioned cutting process can be selectively performed.

In some embodiments, after laminating film is completed, the laminated electrode 400 is subjected to processes comprising package with another electrode (not illustrated), filling of electrolyte, sealing of filling hole of the electrolyte and the like, thereby producing the dye-sensitized cell. In some embodiments, the method of laminating film can be applied in any products packaged with the hot glue layer.

In the method of laminating film, the composite film and the electrode (i.e. the substrate) are pre-aligned by the composite film with the specific structure and the targets disposed on the composite film and the electrode. Further, when the hot glue layer is softened, the attachment of the softened hot glue layer is simultaneously performed by the support of the protective layer, thereby preventing the hot glue layer from shifting the predetermined position after the disposition. It can be automatically performed the processes of laminating film, lowered labor cost, enhanced aligning precision, improved yield rate of products and enhanced production rate with the method of laminating film of the present invention.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A method of laminating a film for a dye-sensitized cell, comprising:
    providing a composite film, wherein the composite film includes a release layer, a protective layer, and a hot glue layer between the release layer and the protective layer, wherein the protective layer is adhered to the hot glue layer by an adhesion agent, a plurality of first targets are at least disposed on an outer surface of the protective layer opposite to an inner surface of the protective layer where the hot glue layer is disposed, and a thermal degradation temperature of the adhesion agent is smaller than a softening temperature of the hot glue layer;
    providing a substrate on a loading platform, wherein a plurality of second targets are on an upper surface of the substrate, and the loading platform heats the substrate at least to the softening temperature;
    taking the composite film with a robotic arm;
    absorbing the composite film on a rolling device at the protective layer;
    removing the release layer from the composite film by the robotic arm;
    positioning the first targets and the second targets to align the substrate with the hot glue layer;
    subjecting the hot glue layer to approach the substrate;
    rolling the composite film along a first direction by a roller of the rolling device, so as to adhere the hot glue layer to the substrate; and
    removing the protective layer.

2. The method of laminating the film for the dye-sensitized cell of claim 1, wherein the loading platform heats the substrate to 90° C. to 160° C.

3. The method of laminating the film for the dye-sensitized cell of claim 1, wherein sizes of the release layer and the protective layer are respectively lager than a size of the hot glue layer, and the size of the release layer is larger than the size of the protective layer.

4. The method of laminating the film for the dye-sensitized cell of claim 1, wherein positioning the first targets and the second targets further comprises:
    shooting the first targets with a first charge-coupled device (CCD) apparatus;
    shooting the second targets with a second charge-coupled device apparatus;
    calculating a relative position of the first targets and the second targets; and
    correcting a coordinate of the loading platform.

5. The method of laminating the film for the dye-sensitized cell of claim 4, wherein the first charge-coupled device apparatus is located under the rolling device, and the second charge-coupled device apparatus is located above the loading platform.

6. The method of laminating the film for the dye-sensitized cell of claim 4, wherein the first charge-coupled device apparatus and the second charge-coupled device apparatus respectively includes a plurality of charge-coupled devices.

7. The method of laminating the film for the dye-sensitized cell of claim 4, wherein correcting the coordinate of the loading platform comprises:
    adjusting a position of the loading platform along the first direction; and subjecting the loading platform to move to a position beneath the rolling device along a second direction perpendicular to the first direction.

8. The method of laminating the film for the dye-sensitized cell of claim 1, wherein rolling the composite film along the first direction by the roller of the rolling device comprises at least one of following steps:

adjusting a pressure applied by the roller;

adjusting a moving velocity of the roller along the first direction; and adjusting a travel of the roller.

9. The method of laminating the film for the dye-sensitized cell of claim 1, wherein absorbing the composite film on the rolling device is achieved by absorbing the protective layer on a screen plate of the rolling device.

10. The method of laminating the film for the dye-sensitized cell of claim 9, wherein a material of the screen plate includes schappe, nylon or polyester.

11. The method of laminating the film for the dye-sensitized cell of claim 1, wherein the protective layer and the release layer respectively has a thickness of 0.05 mm.

12. The method of laminating the film for the dye-sensitized cell of claim 1, wherein materials of the protective layer and the release layer respectively include polyethylene terephthalate (PET) or polyethylene (PE).

13. The method of laminating the film for the dye-sensitized cell of claim 1, wherein the adhesion agent includes an acrylic type adhesion agent.

14. The method of laminating the film for the dye-sensitized cell of claim 1, wherein the substrate is an electrode of the dye-sensitized cell.

* * * * *